July 4, 1961

L. A. CARRIOL 2,990,977

APPARATUS FOR DISPENSING LIQUIDS IN INCREMENTAL UNITS

Filed March 24, 1958

*INVENTOR.*
BY Louis A. Carriol
*ATTORNEYS*

July 4, 1961  L. A. CARRIOL  2,990,977
APPARATUS FOR DISPENSING LIQUIDS IN INCREMENTAL UNITS
Filed March 24, 1958  3 Sheets-Sheet 2
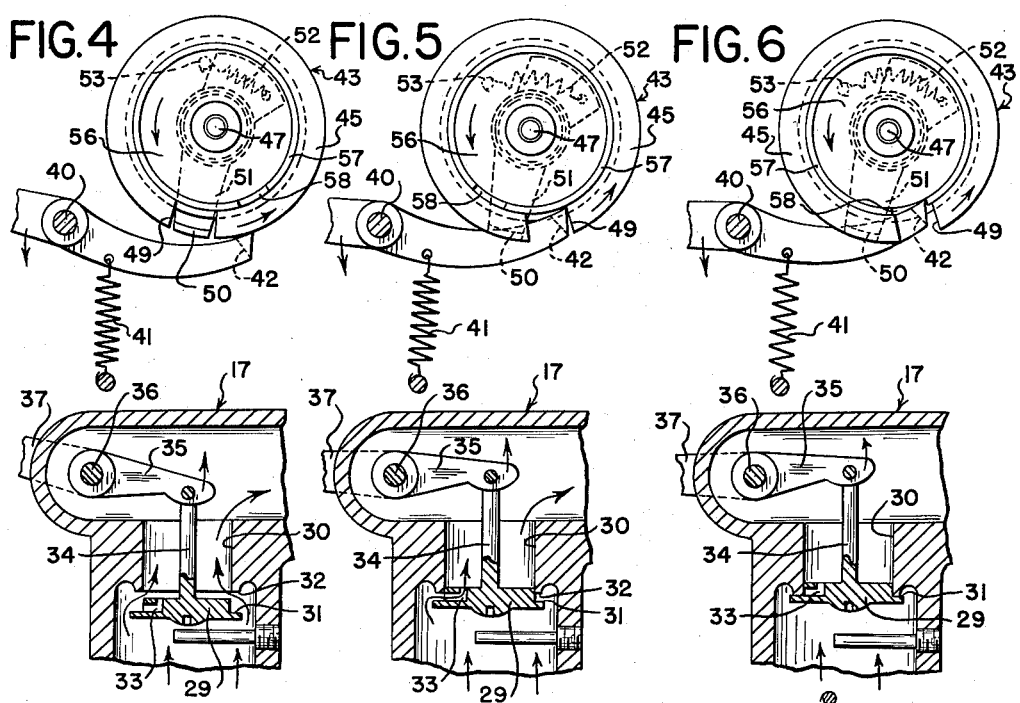
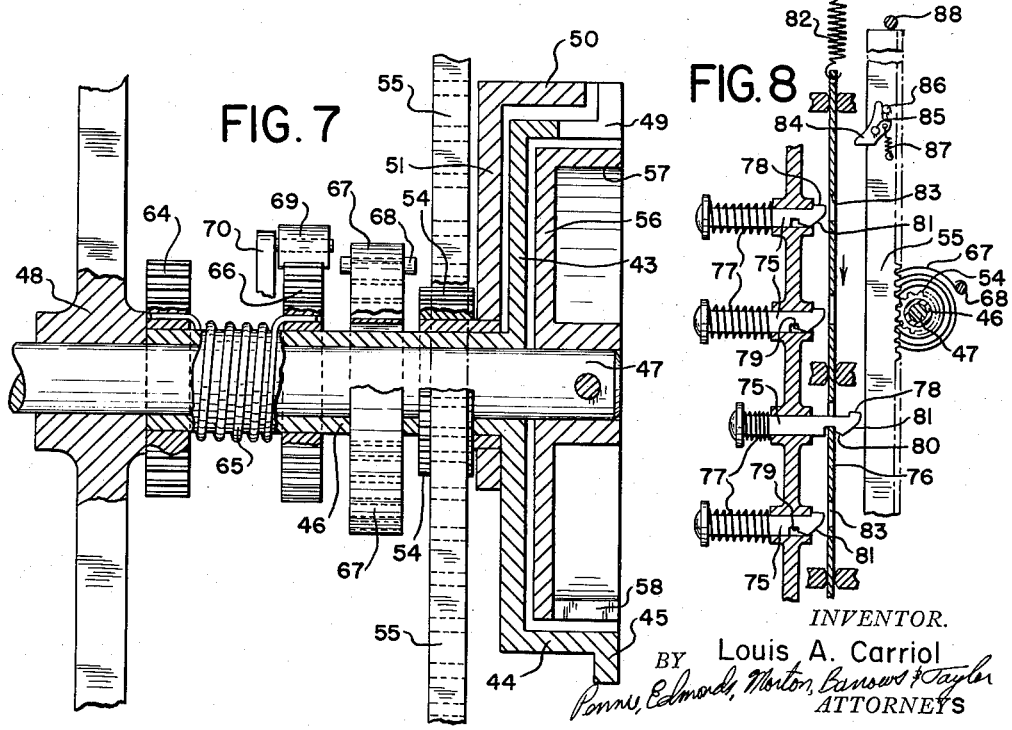
INVENTOR.
Louis A. Carriol
BY
ATTORNEYS July 4, 1961 L. A. CARRIOL 2,990,977
APPARATUS FOR DISPENSING LIQUIDS IN INCREMENTAL UNITS
Filed March 24, 1958 3 Sheets-Sheet 3

INVENTOR.
BY Louis A. Carriol
ATTORNEYS 2,990,977
APPARATUS FOR DISPENSING LIQUIDS IN INCREMENTAL UNITS
Louis A. Carriol, Aulnay-Sous-Bois, France, assignor to Societe d'Etudes, d'Inventions et de Brevets-S.E.I.B., Paris, France
Filed Mar. 24, 1958, Ser. No. 723,415
Claims priority, application France Mar. 26, 1957
8 Claims. (Cl. 222—20)

The present invention relates to apparatus for dispensing liquids, such as gasoline, and more particularly to an improved apparatus for dispensing liquids in predetermined quantities, as by units of volume, mass, or cost.

In liquid delivery systems, such as are commonly utilized for the delivery of automobile fuels, for example, it is often desirable to utilize so-called predetermining means, whereby the operator presets the system for the delivery of a desired amount of liquid. The delivery may then proceed without the operator's attention and terminates automatically after delivery of the desired quantity. The predetermined quantity may be measured in units of volume or mass, such as gallons or pounds, or in monetary units, such as dollars.

Most presently known systems for delivering predetermined quantities of liquid incorporate adjustable means adapted to be preset for the delivery of a desired quantity of liquid and connected to the delivery mechanism by a clutch or like device. Such prior arrangements are not entirely satisfactory, since slippage of the clutch may introduce undesirable errors, while, if the clutching action is sufficiently positive for accurate operation, manual adjustment of the clutch by the operator requires excessive force.

In accordance with the present invention, a novel arrangement is provided for effecting the delivery of predetermined quantities of liquid, in which a member is movable along a path in accordance with the delivery of liquid, and selectively operable means may be placed in the path for engagement by the member, whereby termination of delivery may be effected after predetermined movement of the member. Advantageously, the selectively operable means may comprise a plurality of plunger-like elements, which may be depressed selectively by the operator and which are positioned for engagement with the movable member after delivery of predetermined unit quantities, such as gallons, pounds, or units of predetermined price.

One of the specific features of the invention resides in the provision of cam means movable in accordance with fluid delivery through a meter and adapted to effect the termination of liquid delivery following the delivery of each unit quantity (such as a dollar's worth) of liquid. In combination with the cam means, blocking means are provided, which normally prevent the cam means from terminating delivery, and selectively operable means are provided for rendering the blocking means ineffective during the delivery of the last unit of volume, so that termination of delivery occurs in the desired manner after the last unit is delivered.

In conjunction with the foregoing, the invention incorporates improved cam means comprising a pair of cams driven by a liquid meter, one of the cams being driven in a continuous manner while the other cam is driven by intermittent means, such as a higher order drum of a tens-transfer counter. Such counters are frequently utilized in fuel dispensing apparatus, for example, to provide a visible indication of the amount delivered, and driving one of a pair of co-acting cams by such intermittent means facilitates termination of delivery in two stages i.e., from a normal to a reduced flow rate, followed by complete stoppage of flow. In addition, the improved arrangement provides greater accuracy of measurement, because of the sharp, intermittent movement of the cam into its final position.

Advantageously, the intermittently driven cam operates at a higher speed than the other cam. The high speed cam may make a number of revolutions during the delivery of a single unit, whereas the low speed cam may make only a single revolution, and the cooperative relation of the cams is such that both cams must be aligned in a predetermined manner to effect termination of delivery. Accordingly, near the end of the delivery of a predetermined unit, the low speed cam moves into delivery terminating position to effect a reduction in liquid flow, but delivery is not finally terminated until the high speed cam, shortly thereafter, moves into proper alignment. The arrangement is such that highly accurate control over the delivery may be realized.

The invention also resides in various improvements in specific parts of the apparatus and in specific combinations and sub-combinations thereof, and, for a discussion of the foregoing and other features of the invention, reference should be made to the following detailed description and to the accompanying drawings, in which:

FIGS. 4–6 are sequential views of the mechanism of FIG. 3, illustrating its operation;

FIGS. 7–9 are various cross sectional views illustrating details of the invention; and FIGS. 9–12 are simplified representations of parts of the new apparatus.

Figure 1:
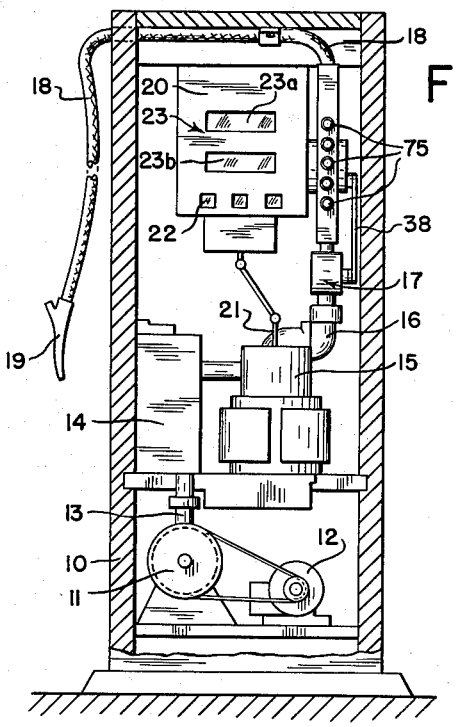
FIGS. 1 and 2 are elevational views of typical installations for the delivery of gasoline, for example, incorporating the improvements of the invention.

Referring now to the drawings, the numeral 10 designates generally a conventional dispensing installation for liquid, such as gasoline, the installation including a pump 11 driven by a motor 12 and having its intake connected to a suitable source of liquid supply (not shown). The outlet 13 of the pump 11 is connected to a separator 14 which, in turn, is connected to a liquid meter 15, advantageously of a positive displacement type. The outlet of the meter 15 is connected by a suitable conduit 16 to a valve 17 to be described in greater detail, and the valve discharges into a delivery line 18 leading to a valved dispensing nozzle 19. In accordance with conventional practice, the installation 10 includes means for energizing the pump motor 12 at desired times, as by opening the dispensing nozzle 19, so that the delivery of liquid may be effected.

The quantity of liquid delivered is conventionally indicated by a totalizer mechanism 20, driven by a shaft 21 from the meter 15. In accordance with known practice, the totalizer mechanism 20 may include a cumulative totalizer 22 and partial totalizer means 23a, 23b. As a general rule, the partial totalizer means 23a, 23b provide an indication of both the volume and price of liquid delivered in a particular dispensing operation. Accordingly, for the purposes of this description the partial totalizer units 23a, 23b may be occasionally considered as a single unit and referred to collectively by the reference numeral 23. The partial totalizer 23 is conventionally adapted to be reset to zero at the end of each dispensing operation, while the cumulative totalizer 22 registers the total amount of liquid delivered through the installation. Advantageously, the totalizer and partial totalizer mechanisms are in the form of conventional tens-transfer counters, in which adjacent drums are interconnected by Geneva-like drives. A complete rotation of a low order drum of the counter brings about, at the end of the revolution, a one-tenth revolution of the drum of the next higher order. The arrangement is shown in simplified representation in FIG. 12, where the reference numerals 24—27 represent drums of, for example, the register 23b of the partial totalizer, and the numeral 28 represents drums of the cumulative totalizer 22.

The specific means for interconnecting the meter shaft 21 to the totalizer mechanism 20, being conventional, is not specifically illustrated. However, it will be understood that suitable means are provided for imparting movement of the meter shaft 21 to the lowest order drums of the respective totalizer mechanisms, substantially in accordance with usual practice.

Figure 3:
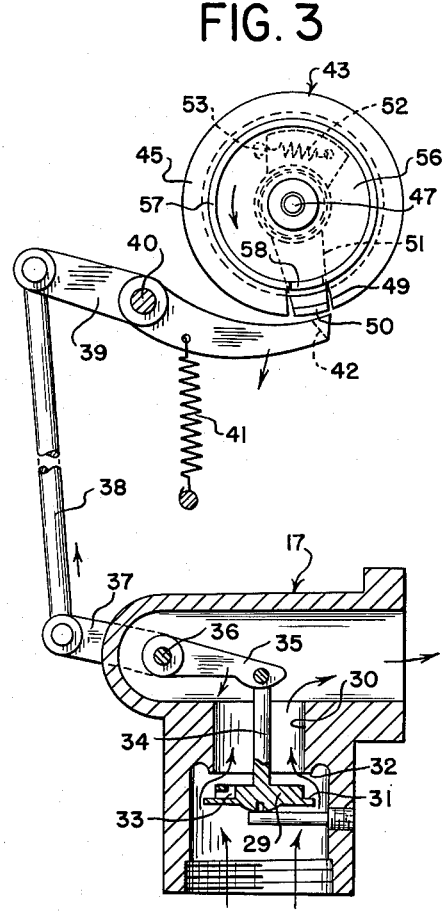
FIG. 3 is an enlarged, fragmentary cross sectional view of an improved mechanism incorporated in the apparatus of FIGS. 1 and 2.
Figure 2:
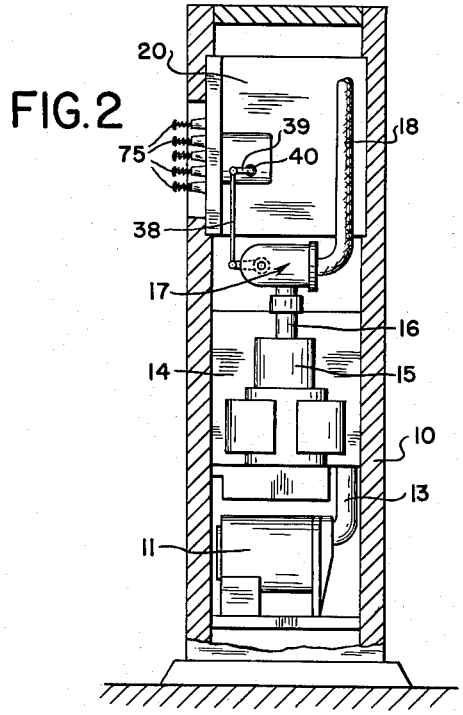

In accordance with the invention, the valve 17 has a valving element 29, which is slidably received in a cylindrical passage 30 in the valve body and has flanges 31 adapted to be seated on valve surfaces 32 to effect closure of the passage. The valve element 29 is also provided, in a cylindrical body portion thereof, with a by-pass passage 33. The arrangement is such that the valve element may have three operative positions: open, partially closed and fully closed. The open position of the valve is illustrated in FIG. 3, wherein the valving element is spaced away from the surfaces 32 providing a relatively unrestricted flow of liquid into the passage 30. The partially closed position is illustrated in FIG. 5 wherein the body portion of the valving element is partly received in the passage 30, blocking off the normal flow of liquid into the passage but providing for restricted flow through the bypass 33. The fully closed position is shown in FIG. 6, wherein the flanges 31 lie in contact with the valving surfaces 32.

Advantageously, the valving element 29 has a stem 34 which projects through the passage 30 and engages an arm 35 mounted on a shaft 36 in fixed relation to a lever arm 37 outside the valve housing. The arm 37 is connected, by means of a link 38, to a control arm 39, which is pivoted on a shaft 40 and urged in a clockwise direction, as viewed in FIG. 3 by a spring 41. The spring 41 thus tends to depress the valve operating arm 35 and maintain the valving element 29 in its open position. However, the arrangement of the valving element 29, in relation to the surrounding liquid passages, is such that, during the delivery of liquid through the valve, which requires an upward flow of liquid through the passage 30, the liquid pressure differential on opposite sides of the element 29 urges the element to its closed position with a force in excess of the valve opening force applied by the spring 41. Accordingly, at all times during the delivery of liquid, the valving element 29 tends to move to its closed position, unless restrained by means in addition to the spring 41.

In the illustrated form of the invention the valve element 29 is held open during liquid delivery by novel cam means acting upon a lateral projection 42 at the end of the control arm 39. The improved cam means includes a drum 43 having a cylindrical portion 44 and a radial flange 45. The drum 43 is fixed to a sleeve 46, which is rotatably mounted on a shaft 47, and the shaft 47 is journaled for rotation on a fixed axis determined by bearing means 48. The arrangement of the shaft 47, sleeve 46 and drum 43 is such, in relation to the control arm 39, that the projection 42 on the control arm may bear against the radial flange 45 of the drum and is prevented thereby from moving in a direction to permit closure of the valve element 29.

As shown in FIGS. 3 and 7, for example, the drum 43 is provided with a notch 49 in its radial flange and cylindrical portion, the notch being of greater width than the control arm projection 42, whereby the projection may enter the notch to permit closing movement of the valve element 29. In accordance with one aspect of the invention the notch 49 is normally closed by a blocking element 50 carried by an arm 51, which may be referred to as a blocking arm. The blocking arm 51 is mounted for limited rotational movement on the sleeve 46 and is normally held in a predetermined relation to the drum 43 of a strong spring 52 which draws the arm against an abutment pin 53. The arrangement is such that, when the blocking arm is against the pin 53, the element 50 closes the notch 49 by effectively continuing the peripheral outline of the radial flange 45.

In accordance with the invention, the blocking arm 51 is adapted to rotate along with the drum 43 so that, in all rotary positions of the drum, the notch 49 thereof is blocked by the element 50. However, at appropriate times, the blocking arm 51 may be caused to move relative to the drum to expose the notch and permit the reception therein of the control arm projection 42. To this end, the blocking arm 51 is fixed to a pinion 54 engaging an elongated, vertically disposed rack 55 guided for vertical movement by suitable means (not shown). As will be described in further detail, during the dispensing of liquid the pinion 54 rotates with the drum 43 in a direction to carry the rack 55 downward and, at a predetermined point, the downward movement of the rack is positively stopped, preventing further movement of the pinion 54 and blocking arm 51. Accordingly, continued rotation of the drum 43 causes the notch 49 to be displaced from the element 50 in the manner desired.

Mounted on the shaft 47 is a cam 56, in the form of a drum having a cylindrical portion 57 concentric with the cylindrical portion 44 of the drum 43, and having a notch 58 of suitable width to receive the control arm projection 42. The drum 56 is fixed to the shaft 47 for rotation therewith.

Figure 12:
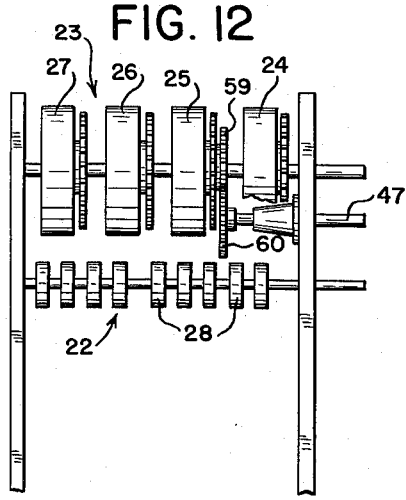

In accordance with one aspect of the invention, the shaft 47 is driven by an intermittently operated drum (i.e., a drum above the lowest order) of the partial totalizer 23. Thus, as illustrated in FIG. 12, a pinion 59 is driven by the second order drum 25 and meshes with a pinion 60 fixed to the end of the shaft 47. The arrangement is such that, during operation of the partial totalizer, the shaft 47 is driven intermittently in accordance with operations of the second order drum 25. Advantageously, the drum 25 may register units representing a small fraction of a primary unit of delivery. That is, if it is desired to effect the delivery of liquid in units of, for example, one dollar, two dollars, three dollars, etc., each unit of the drum 25 may represent one cent and a full revolution of the drum may represent ten cents. Where the primary unit of delivery is for example, five hundred francs, each unit of the drum 25 may represent ten francs and a full revolution may represent one hundred francs. Of course, the units of delivery may be in terms of volume, mass, etc., and may be sub-divided in any appropriate manner.

In the illustrated apparatus, the drum 43 may advantageously make one complete revolution during the dispensing of one primary delivery unit, while the drum 56 makes a plurality of revolutions. For driving the drum 43 a novel arrangement is provided including sets of helicoid gears 61, 62 and 63, 64. The gear 61 is advantageously driven by the cumulative totalizer mechanism 22 and may be arranged to impart a uniform of continuous driving motion as distinguished from the intermittent motion imparted to the shaft 47. In accordance with the invention, the pinion 64 is mounted loosely on the sleeve 46 and is connected to the sleeve by a spring 65 anchored at one end in the pinion and at its other end in a ratchet wheel 66. The spring 65 is normally slightly smaller than the sleeve 46, so that the spring firmly grips the sleeve when applied thereover. In addition, the spring is wound in a direction such that the application of rotating force to the pinion 64, to effect rotation thereof in the desired direction (counterclockwise as viewed in FIG. 8), tends to tighten the spring on the sleeve. Accordingly, the spring forms a substantially positive drive connection between the pinion 64 and the sleeve 46, whereby the sleeve may be rotated in accordance with operations of the cumulative totalizer 22.

The sleeve 46 is provided with means, such as a spring 67 attached at one end to the sleeve and anchored at a fixed point 68, for rotating the sleeve to a predetermined starting position at desired times. However, to effect a return of the sleeve to its starting position, the drive connection between the pinion 64 and the sleeve must be released, and this is accomplished by means of the ratchet wheel 66, which is mounted loosely on the sleeve and may be rotated on the sleeve in a direction tending to unwind the spring 65 and thereby effect the release of its grip upon the sleeve.

Figure 9:
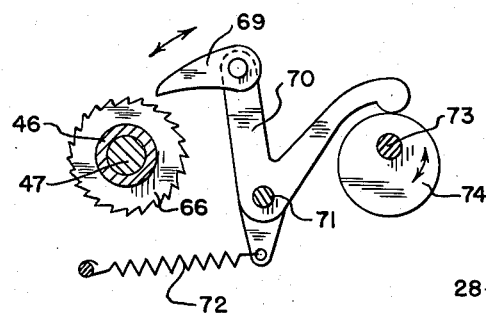
Figure 11:
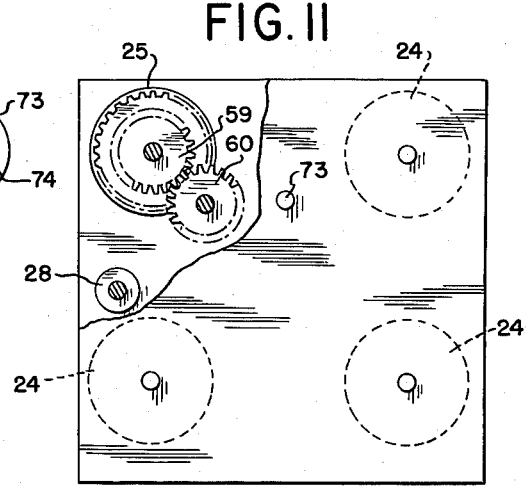
Figure 10:
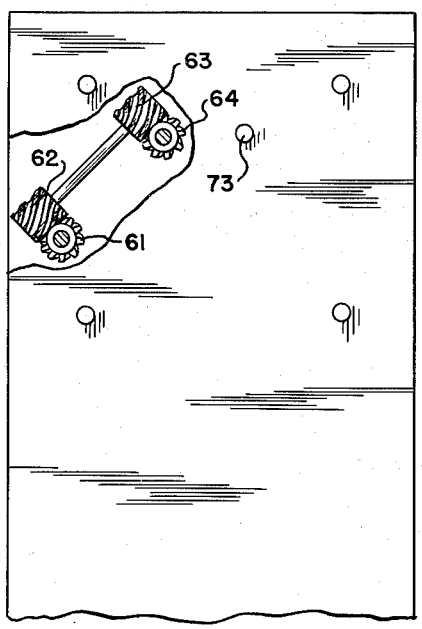

Advantageously, the ratchet wheel 66 is actuated by means of a pawl 69 carried by a bell crank lever 70 mounted on a shaft 71. The lever 70 is normally held in an inoperative position by a spring 72 but may be caused to rock in a counterclockwise direction, as viewed in FIG. 9, by rotation of a shaft 73 carrying an eccentric 74. The shaft 73 advantageously forms part of an otherwise conventional reset mechanism actuated by an operator at the end of each delivery to reset the partial totalizer 23 to zero. Thus, when the shaft 73 is rotated, the pawl 69 moves into engagement with the ratchet wheel 66 to shift it in a direction to unwind the spring 65, releasing the sleeve 46 and allowing it to be returned to a predetermined starting position by the spring 67.

For predetermining the quantity of liquid to be dispensed, there are provided a plurality of selectively operable, plunger-like abutment elements 75 slidably supported for movement toward and away from a locking member 76 and normally urged toward inoperative positions by springs 77. The abutment elements 75 have upwardly facing abutment surfaces 78 at their ends and are provided adjacent their ends with notches 79 and oppositely inclined lower surface portions 80, 81 extending forward from the notches. The locking member 76 is advantageously an elongated plate guided for limited vertical movement and urged upward by a spring 82. The plate 76 has openings 83 therein adjacent each abutment element and, when an abutment element is pressed inward, the lower edge of the opening adjacent the element is engaged by the surface 81 to draw the locking plate 76 downward. The plate is then received in the notch 79 of the abutment element, so that the plate and element are mutually interlocked. When a different element is pressed inward a previously interlocked element is released and moved to a retracted position by its spring 77.

The abutment surfaces 78 of the elements 75 are arranged, when an element is depressed, to lie in the path of a pawl 84 carried by the rack 55. The pawl 84 is pivoted on the rack by a pin 85 and is held against a stop 86 by a spring 87. Thus, while the pawl may move upward freely past a depressed abutment element, it forms, in effect, a fixed part of the rack when moved downward into contact with an abutment surface. Advantageously, the rack 55 and pawl 84 are so arranged, with respect to the abutment elements 75, that the pawl has an initial or starting position spaced above the uppermost abutment element a predetermined amount, slightly less than the extent of movement of the rack during the delivery of one primary unit of liquid, and, to this end, a suitable stop member 88 is provided above the rack and limits the upward movement thereof to set the mechanism in its starting position.

At the start of a delivery operation, the valve element 29 is open and the control element projection 42 is held slightly away from the periphery of the cam drum 43 by the action of the spring 41. The notches 49, 58 in the cams, are aligned with the projection 42, the notches being blocked, however, by the element 50.

To effect the delivery of, for example, three primary units, the appropriate abutment element is depressed, releasing any element which may have been depressed previously. The flow of liquid is then initiated by energizing the pump 11 and opening the dispensing valve 19. The liquid flows from the pump through the valve 17, and in doing so, urges the valve element 29 toward a closed position with a force in excess of that applied by the spring 41, so that the control arm projection 42 moves against the periphery of the cam 43. The valve element is held at an open position, however, as the projection cannot enter the cam notches.

As delivery proceeds, the meter 15 effects the actuation of the totalizer 20, so that the respective cams 43, 56 are rotated, the cam 43 at a rate of one revolution per primary unit and the cam 56 at the rate of several (i.e., ten) revolutions per primary unit. At the same time, the rack 55 is caused to move downward in accordance with rotation of the cam 43, which carries with it the blocking arm 51 and pinion 54, the spring 52 being sufficiently strong to effect movement of the rack 55 while holding the blocking arm against the stop 53.

After delivery of one primary unit, the notch 49 is again aligned with the control arm projection 42, but the projection is prevented from entering the notch by the inter-position of the blocking element 50. Accordingly, delivery continues unaffected.

As delivery of the desired number of primary units near completion, the pawl 84 engages the previously depressed abutment element, and further downward movement of the rack 55 is prevented. At this time the respective drums 43, 56 may be in the positions illustrated in FIG. 4. Accordingly, upon continued delivery of the liquid, the outer cam 43 continues to rotate, effecting relative displacement between the notch 49 and the element 50 as the notch 49 moves into alignment with the control arm rejection 42. In accordance with one aspect of the invention, when the open notch 49 becomes aligned with the projection 42, the force of the liquid on the valve element 29 causes the element to be moved upward, thereby moving the projection 42 into the notch 49 and against the periphery of the inner cam 56. The arrangement thus described is illustrated in FIG. 5, and it will be observed therein that the dimensions of the cam 56 are such as to hold the projection 42 in a position permitting only partial closure of the valve element 29. Accordingly, continued flow of liquid through the bypass 33 is permitted, so that delivery continues, although at a much reduced rate.

When the valve element 29 becomes partially closed only a relatively small amount of liquid remains to be delivered, and, upon completion of the further delivery, the notch 58 is shifted, by the intermittent action of the drum 25, into alignment with the control arm projection 42, permitting full inward movement of the projection and allowing the pressure of the liquid to close fully the valve element 29.

When the pump 11 is de-energized, following a delivery operation, pressure is released from the valve element 29, which is then opened by the spring 41, withdrawing the projection 42 from the cam notches. The apparatus may then be conditioned for a further delivery operation by rotating the shaft 73 to reset the partial totalizer and release the sleeve 46 for return movement by the spring 67. The spring 67 rotates the sleeve 46 in a return direction until the rack 55 engages the stop 88, and the return movement of the mechanism releases the blocking arm 51, which is then moved against the stop 53 by the spring 52 so that the element 51 blocks the cam notches.

The new apparatus is advantageous, in that it provides a generally simplified, yet accurate and dependable means for delivering predetermined, unit quantities of liquid. An operator may set the apparatus quickly and easily by actuating means, such as plunger-like elements, so that a member movable in proportion to liquid delivered, is engaged at a desired time to effect discontinuance of delivery. And highly accurate control over the termination of delivery is enabled by the provision of improved cam means, which are conditioned, during delivery of the last portions of a predetermined quantity of liquid, to stop of liquid flow with substantial precision.

I claim:

1. An apparatus for delivering a predetermined number of unit quantities of liquid, comprising a delivery line, a valve in said line biased toward closed position during the flow of liquid, cam means operable in cycles in response to the flow of liquid in said line, each of said cycles corresponding to the flow in said line of a unit quantity of liquid, said cam means normally retaining said valve in an open position and having an operative condition in which valve closure may be effected once each cycle, blocking means associated with said cam means for normally retaining said valve in an open position when said cam means is in said operative condition and control means including a plurality of selectively operable and independently movable control elements for rendering said blocking means ineffective after a preselected number of cycles of operation of said cam means, each of said control elements corresponding to a different number of unit quantities of liquid delivered, said control means including a control member connected to said blocking means and movable thereby through a path adjacent said control elements, said control elements being projectible upon selective operation into said path, said control member being engageable with a selected control element in said path to render said blocking means ineffective.

2. The apparatus of claim 1, in which said blocking means comprises a blocking arm mounted for rotation with said cam means and normally held in effective position by a spring, said control member is driven by rotation of said blocking arm, a pawl is mounted on said control member for engagement with a selected one of said control elements, said pawl preventing further movement of said control member and blocking arm upon engagement of said pawl with said selected control element to effect relative rotation between said cam means and blocking arm to render said blocking arm ineffective.

3. The apparatus of claim 2, in which the cam means comprises a cam having a notch therein, a valve actuating member is positioned to be received in said notch, and said blocking member is positioned normally to close said notch and prevent the entry of the valve actuating member therein.

4. The apparatus of claim 3, in which said cam means comprises a pair of concentric drums mounted upon a shaft for relative co-axial rotation, the perimeters of each of said drums each having a notch therein for receiving said valve actuating member, said notches coming into radial alignment during the relative rotation of said drums, and means corresponding to the flow of a unit quantity of liquid for driving the inner drum at a higher speed than the outer drum.

5. The apparatus of claim 1, in which the control member comprises a rack movable in accordance with rotations of said cam means and blocking means, abutment means on said rack for engaging a selected one of said control elements, and spring means interconnecting said blocking means and rack with said cam means and accommodating rotation of the cam relative to said blocking means following engagement of said abutment means with said selected control element.

6. The apparatus of claim 5, in which spring means are provided to urge said rack and cam means toward starting positions, clutch means are provided for driving said cam means, and means are provided for disengaging said clutch means at the end of a delivery operation.

7. The apparatus of claim 1, in which the control elements are plunger-like elements mounted for movement between extended and retracted positions, and means are provided for locking a selected control element in extended position.

8. The apparatus of claim 7, in which said control elements are spring urged to retracted positions, and said means for locking is operative upon movement of a control element to extended position to release any other control element for movement to a retracted position.

References Cited in the file of this patent

UNITED STATES PATENTS

| | | |
|---|---|---|
| 2,527,703 | Carbonaro | Oct. 31, 1950 |
| 2,533,319 | Hazard | Dec. 12, 1950 |
| 2,700,487 | Thoresen et al. | Jan. 25, 1955 |
| 2,796,090 | Carriol | June 18, 1957 |
| 2,797,025 | Carriol | June 25, 1957 |
| 2,804,991 | Burleyson | Sept. 3, 1957 |
| 2,812,107 | De Young | Nov. 5, 1957 |